US011237752B2

(12) United States Patent
Seelemann, II et al.

(10) Patent No.: US 11,237,752 B2
(45) Date of Patent: Feb. 1, 2022

(54) AUTOMATED DATA TRANSLATION

(71) Applicant: International Business Machines Corporation, Armonk, NY (US)

(72) Inventors: Dirk Alexander Seelemann, II, Ontario (CA); Michael Jory, North York (CA)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 149 days.

(21) Appl. No.: 16/854,333

(22) Filed: Apr. 21, 2020

(65) Prior Publication Data

US 2021/0326045 A1    Oct. 21, 2021

(51) Int. Cl.
| | |
|---|---|
| *G06F 12/00* | (2006.01) |
| *G06F 3/06* | (2006.01) |
| *H04L 29/08* | (2006.01) |
| *G06Q 30/04* | (2012.01) |
| *G06Q 10/10* | (2012.01) |
| *G06F 16/27* | (2019.01) |
| *G06F 13/00* | (2006.01) |
| *G06F 13/28* | (2006.01) |

(52) U.S. Cl.
CPC .......... *G06F 3/065* (2013.01); *G06F 3/0604* (2013.01); *G06F 3/067* (2013.01); *G06F 3/0653* (2013.01); *G06F 16/27* (2019.01); *G06Q 10/10* (2013.01); *G06Q 30/04* (2013.01); *H04L 67/1095* (2013.01)

(58) Field of Classification Search
CPC ...... G06F 3/065; G06F 3/0604; G06F 3/0653; G06F 16/27; G06F 3/067; H04L 67/1095; G06Q 30/04; G06Q 10/10
See application file for complete search history.

(56) References Cited

U.S. PATENT DOCUMENTS

| | | | |
|---|---|---|---|
| 6,571,232 B1* | 5/2003 | Goldberg | G06F 16/9574 |
| 6,915,287 B1* | 7/2005 | Felsted | G06F 16/289 |
| 8,782,101 B1* | 7/2014 | Moore | G06F 16/258 |
| | | | 707/811 |
| 9,176,997 B2* | 11/2015 | Balasubramanian | ............ |
| | | | G06F 16/214 |

(Continued)

FOREIGN PATENT DOCUMENTS

WO    2017023426 A1    2/2017

*Primary Examiner* — Mark A Giardino, Jr.
(74) *Attorney, Agent, or Firm* — Garg Law Firm, PLLC; Rakesh Garg; William Hartwell

(57) ABSTRACT

An embodiment includes locating source data associated with a data replication request, and identifying a property of a data value of the source data using a reflection process. The embodiment determines a meta-type for the data value using an automaton that identifies a matching extent class from among an indexed set of extent classes that define respective accessors that are invoked to locate an extent class that corresponds with the property of the data value. The embodiment generates target data having the data value and a data type that corresponds with the matching extent class. The embodiment generates a changes feed that includes the generated target data, evaluates data in the changes feed to determine whether a specified condition has been satisfied and, if so, generates a trigger signal that initiates an event, where the trigger signal comprising information that satisfied the specified condition.

20 Claims, 6 Drawing Sheets

(56) References Cited

U.S. PATENT DOCUMENTS

| | | |
|---|---|---|
| 9,417,890 B2 | 8/2016 | Reddish et al. |
| 9,430,505 B2* | 8/2016 | Padmanabhan ....... G06F 16/214 |
| 2003/0028555 A1* | 2/2003 | Young ................... G06F 16/214 |
| 2005/0071359 A1* | 3/2005 | Elandassery .......... G06F 16/213 |
| 2005/0149537 A1* | 7/2005 | Balin .................... G06F 16/214 |
| 2018/0136911 A1 | 5/2018 | Goja et al. |
| 2019/0265971 A1 | 8/2019 | Behzadi et al. |
| 2020/0026532 A1* | 1/2020 | Bill ........................ G06F 9/451 |

* cited by examiner

AUTOMATED DATA TRANSLATION

BACKGROUND

The present invention relates generally to a method, system, and computer program product for data administration. More particularly, the present invention relates to a method, system, and computer program product for automated data translation.

A "database management system" (DBMS) is a type of software application designed for administering databases, which generally includes creating, querying, and updating databases. There are many different DBMS applications available, and while most are compatible with a wide range of databases, the DBMS applications differ somewhat from each other.

One significant difference between different DBMS applications involves variations in support and implementation of data types. When a DBMS creates a table or adds a field to a table in a database, fields are created as specific data types. DBMS applications use data types as classifications that identify possible values for and operations that can be done on the data, as well as the way the DBMS stores data in that field in the database. Because of these variations in data types, it is a non-trivial task to copy data from one type of DBMS to another.

Database replication (or data replication) involves the heterogeneous copying of data between disparate kinds DBMS applications. Thus, data replication differs significantly from the bit for bit copying of data in a database or between the same types of DBMS applications. Data replication includes various conversions, including data-type conversions, so that the data from the source DBMS will be compatible with the target DBMS. The data-type conversions must be handled carefully with an understanding of how the different data types are equivalent and how they differ because the conversion can impact the data content.

SUMMARY

The illustrative embodiments provide for automated data translation. An embodiment includes locating, responsive to a data replication request, source data associated with the data replication request, the source data including a data value encoded in a class-based meta-type system for storing and accessing meta-type properties. The embodiment also includes identifying a property of the data value using a predetermined reflection process. The embodiment also includes determining a meta-type for the data value using an automaton that identifies a matching extent class from among an indexed set of extent classes that define respective accessors, the automaton invoking accessors of the extent classes to locate the matching extent class that corresponds with the property of the data value. The embodiment also includes generating target data having the data value and a data type that corresponds with the matching extent class. The embodiment also includes generating a changes feed that includes the data value and data type of the generated target data. The embodiment also includes continuously monitoring the changes feed during a plurality of additional iterations of the identifying of the property, the determining of the meta-type, the generating of the target data, and the generating of the changes feed. The embodiment also includes evaluating data received via the changes feed to determine whether a specified condition has been satisfied, and if so, generating, responsive to determining that the specified condition has been satisfied, a trigger signal that initiates an event, the trigger signal comprising data indicative of information from the changes feed that satisfied the specified condition. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
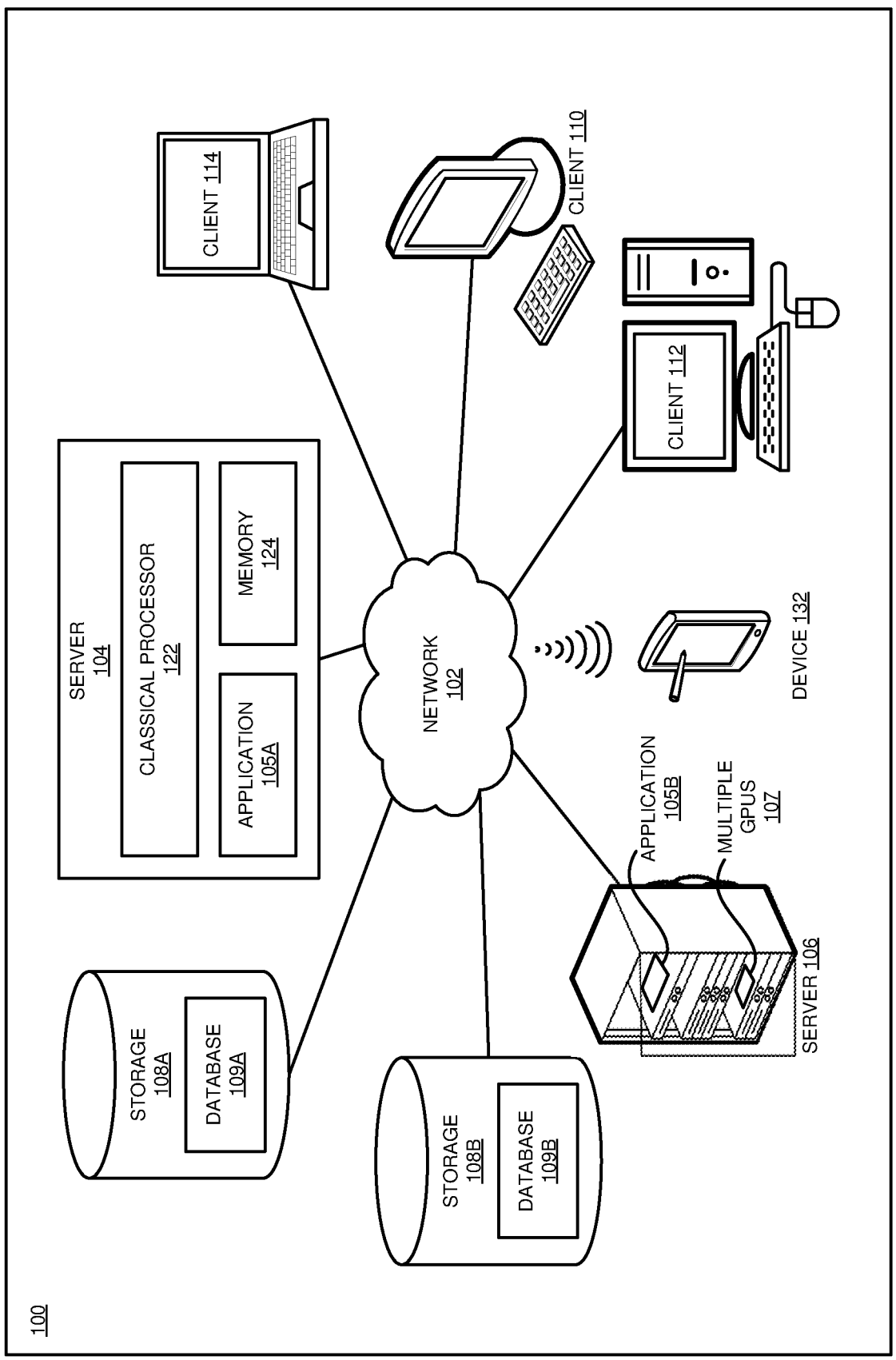
FIG. 1 depicts a block diagram of a network of data processing systems in which illustrative embodiments may be implemented.

In fields related to database technology, the need for data-type conversions arises in scenarios that involve moving data to a different database or upgrading an existing database. Existing techniques for data-type conversion fall in two broad categories: they either canonicalize the application programming interface (API) to access data, or they canonicalize the data. However, APIs constrain the input to some set of supported definitions, and canonical definitions require all participants to convert data types to a single canonical definition.

Existing techniques for data-type conversion require considerable time and manpower, are prone to error, and prevent automation of related processes. For example, canonicalizing of the API or data require human interaction (a programmer) to consume. Given a ResultSet, for example, an automaton operating according to prior techniques would not be capable of determining an optimal format in which to consume the data, so a human intervention would be required to select an optimal format and write the program code to implement the format selection.

Such manual efforts are typically required for data-type conversion within the context of a database change and prevent full automation of a parent process, such as data replication processes, that includes data-type conversion as a child process. Also, with regard to data replication, since data replication is general purpose, and since the database consumer's additions to the database are effectively unknown in advance, type conversions and canonical object mappings performed according to prior techniques that are not needed would still be executed without human intervention, which results in wasted efforts and resources. As an example, IBM db2 supports a "decfloat" data type that permits a wider range of values than a "double" data type that is alternatively used by some other systems. This means that fixed API or a canonical data types configured for "double" data types will not allow for data replication with full fidelity due to data lost while converting "decfloat" data to "double" data.

The illustrative embodiments include embodiments that comprise a data-type conversion process or data-type conversion application within the context of a data replication process in order to provide context and for ease of understanding of the data-type conversion features described herein, but data-type conversion features disclosed herein are equally useful as part of other database processes, for example data recovery, data backup, and database upgrades. Also, embodiments disclosed herein are described with reference to an automated process or processes, however alternative embodiments include one or more automatons for performing such processing. Embodiments comprise a data-type conversion that includes canonicalizing the data access process, such that an automated program can consume and produce data. In some embodiments, the data is encoded by means of a declarative, extensible, semantic-type aware indexing mechanism reads and writes values. Such embodiments handle both common and unusual data types with full fidelity and support conversion among them, instead of either an API of all possible values, or a canonical definition.

The illustrative embodiments recognize the above shortcomings of the prior art can be overcome with the help of a new meta-structure introduced herein and referred to as an "Extent." Extents introduce a new declarative system based on common ur-types (things that repeat, things that contain things, things we can do arithmetic on, things we can read). For example, where an API has an integral number to be an instance of 'int' or BigInteger, Extents are more comparable to a meta-API in that they Extents implement an abstract classifier that prescribes how the data can be consumed. In the case of the integral number data, the automaton associates a "Numberish" classifier Extent that supports all data types with numeric operations.

In some embodiments, an automated process or automaton recognizes predefined functional descriptions available for use by users to explain how the users want to replicate their data. In some embodiments, the automated process will convert the user's data in accordance with the user's input regarding the user's intent (e.g., "I want to concatenate this string and this number and store it in this location"). In some embodiments, the user's intent includes source and target type definitions for the data. In some such embodiments, each type of data is associated with an Extent that includes encoding for the structural information of the data and how to retrieve it. In some embodiments, each Extent is a meta-type system that lacks canonical structure, but has an Extent class that defines a single accessor that allows the automated process to discover the full fidelity of the data value. Thus, in some embodiments, an automated process uses Extents to work on common and unusual data in full fidelity.

In some embodiments, the source data comprises a plurality of layers. For example, in some embodiments, the source data will comprise an envelope layer and a payload layer. In some embodiments, the envelope layer includes a coding layer that includes source code for structures of the source database. In such embodiments, the data of the payload layer is not part of a recovery log format directly. Instead, such data is an additional format that the database vendor is applying on top of their recovery log format. Thus, for embodiments where the source data is from a recovery log or the like, there is encoding within the recovery log and there are other structures that are further encoded according to the table schema. In some embodiments, the database structures originated from source code written in C or C++ at the database vendor or elsewhere.

For such embodiments that include multiple layers, such as the envelope layer and the payload layer, Extents encode both the envelope layer and the payload layer. Also, in some embodiments, database vendors layer their own data types on top of standard primitive data types. Nevertheless, the data replication layers added by the vendor as the envelope layer is can be encoded in advance. However, the payload layer where the user is inserting their own structures that cannot be known in advance cannot be encoded in advanced. The payload layer cannot be encoded in advance because doing so would require writing all the code for all the different structures that all the different users all over the world now and in the future could ever write, which is not practical or possible. Instead, the data replication application defines new types as needed and writes the code to process those types.

In some embodiments, a data-type conversion system includes an Extent index querying module that provides a plugin extension mechanism for adding new Extent models. In some embodiments, Extent instances are reusable indexes into data values.

In some embodiments, a data-type conversion process is part of a data replication process that includes a user interface. In some such embodiments, the user interface includes a graphical user interface (GUI), a command line interface, and/or a replication dashboard. In some embodiments, the interface allows a user to submit various user inputs to the data replication application, including replication requests. In some embodiments, the interface includes form input elements that a user can populate with data that will be submitted as form data to submit replication requests. In some embodiments, the interface allows a user to set configuration parameters for configuration of a source database and a target database associated with the replication request. In some embodiments, the interface allows a user to create the target database. In some embodiments, the interface generates display data for displaying information on a display device, including any of the information described herein, including display of a GUI, command line, and/or dashboard.

In some embodiments, the interface allows a user to monitor the data replication process and receive various reports while the replication process is ongoing and/or upon completion of the replication process. In some embodiments, the interface includes a browser-based front end that displays status, alert, and performance information for the replication process. For example, in some embodiments, the interface provides a graphical display of a summary overview that indicates all send and receive queues that are active. In some embodiments, the interface monitors the progress of the replication process and updates the information shown on the graphical display in real time or near real time.

In some embodiments, a data replication application generates one or more connections that are used to replicate data between the source database and the target database. For example, in some embodiments, the data replication application stores information regarding details of respective transactions (e.g., a set of tables and their columns along with other change data capture (CDC) properties such as filter/user exit, expressions, etc.) that are being replicated and details of how the source data is applied to the target database. In some such embodiments, the replication dashboard provides a graphical display of information regarding status, alert situations, performance indicators for existing and/or active connections.

In some embodiments, the source database interface communicates with source data storage. In some embodiments, the source database interface locates source data in the source database for replication according to the replication request. For example, in some embodiments, the replication request designates some or all of the data of the source database as source data to be replicated.

In some embodiments, a data-type conversion application includes a reflection module that receives data values of the source data and uses a predetermined reflection process to identify properties of the received data values. In some embodiments, the reflection module includes a reflection API. In some embodiments, the reflection API allows an automated computerized process or automaton to inspect one or more data fields of the source data to identify properties of the data values. In some embodiments, the predetermined reflection process returns a full-fidelity representation of the property of the data value. In some embodiments, the reflection module uses use a runtime type identification system, for example the Java® Reflection API, to discover the meta-type and encoding for each data value (Java is a registered trademark of Oracle America, Inc.). Java Reflection allows an executing Java program to examine or "introspect" upon itself, and manipulate internal properties of the program. In such embodiments, the source database and the target database use a Java Class based system for storing and accessing meta-type properties.

In some embodiments, a data-type conversion application includes an Extent index querying module that determines a meta-type for each data value using an Extent data indexing system. In some embodiments, Extents are a top-down recursive descent recreation of the source data structures. Thus, in some such embodiments, Extents are a meta-type system and comprise the encoding for the structural information and how to retrieve it. In some embodiments, a data-type conversion application includes Extent classes that each defines a single accessor that enables an automated computerized process or automaton to match Extents to source data values by comparing accessor responses to properties of the source data types identified by the reflection module. Thus, each Extent class defines a single accessor that the Extent index querying module can invoke to fetch information about the Extent class stored within the Extent class. The information about the Extent classes enables automation of a matching process that searches for an Extent class that can provide for a full fidelity representation of a data value by comparing the accessor responses to the information gleaned about the data values from the reflection processes.

In some embodiments, Extents are extensible meta-type classes that support data-type coercion. For example, IBM DB2 supports a "decfloat" data type that permits a wider range of values than double types of other DBMS applications (IBM and DB2 are a registered trademarks of International Business Machines Corp.). Thus, canonical conversion from decfloat to double necessarily loses information. However, in some embodiments, a special decfloat Extent number meta-type is defined that captures the full precision of the native data type, as well as its properties, for example its numeric properties and coercions to other number meta-types.

In some embodiments, a data-type conversion application includes an Extent index querying module that combines the Extent mechanism with a functional, set based query engine that enables common operations for each class of data type: number, string, map, array, etc. In some embodiments, the functional nature enables automation of replication tasks: all expressions operate on temporarily immutable data that represents a statement of truth. In some embodiments, set-based predicates operate on data sets that match a particular, immutable, expression, which allows the data replication application 324 to:

1) Detect unused values, allowing them to be indexed but not read or written;
2) Perform work across parallel threads, by evaluating predicates that partition that work into non-overlapping sets;
3) Pipeline work over different parallel processing segments, relying on the immutable property of intermediate results to partition different expressions sequentially;
4) Arbitrage workloads, for example by detecting through meta-evaluation that certain workloads intersect and so can be executed once commonly rather than repeated individually;
5) Compute the intersection and difference among multiple workloads, enabling new approaches like statistics based optimization. This is not an exhaustive list.

Since the specific data values and their full fidelity representation are known (being specified in place of providing an API), and because the Extent provides the concrete type of the indexed objects, the drawbacks of existing systems are eliminated. The Extent model specifies the type system in an Automaton consumable manner, and our system can parse the minimal set of data needed to supply the required answers; saving resources. Further, the functional expression approach means our automaton can scale the system through the use of predicates to uniquely assign work without human intervention.

In some embodiments, a data-type conversion application includes a target database interface that communicates with a target data storage and a source database interface that writes the replicated source data as target data in the target database. In some embodiments, the data-type conversion process is performed at the source end, meaning that the data-type conversion is performed before the data is transmitted to the target DBMS. In alternative embodiments, the data-type conversion process is performed at the target end or elsewhere in route to the target end, meaning that the data-type conversion is performed after the data is transmitted by the source DBMS.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example.

Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
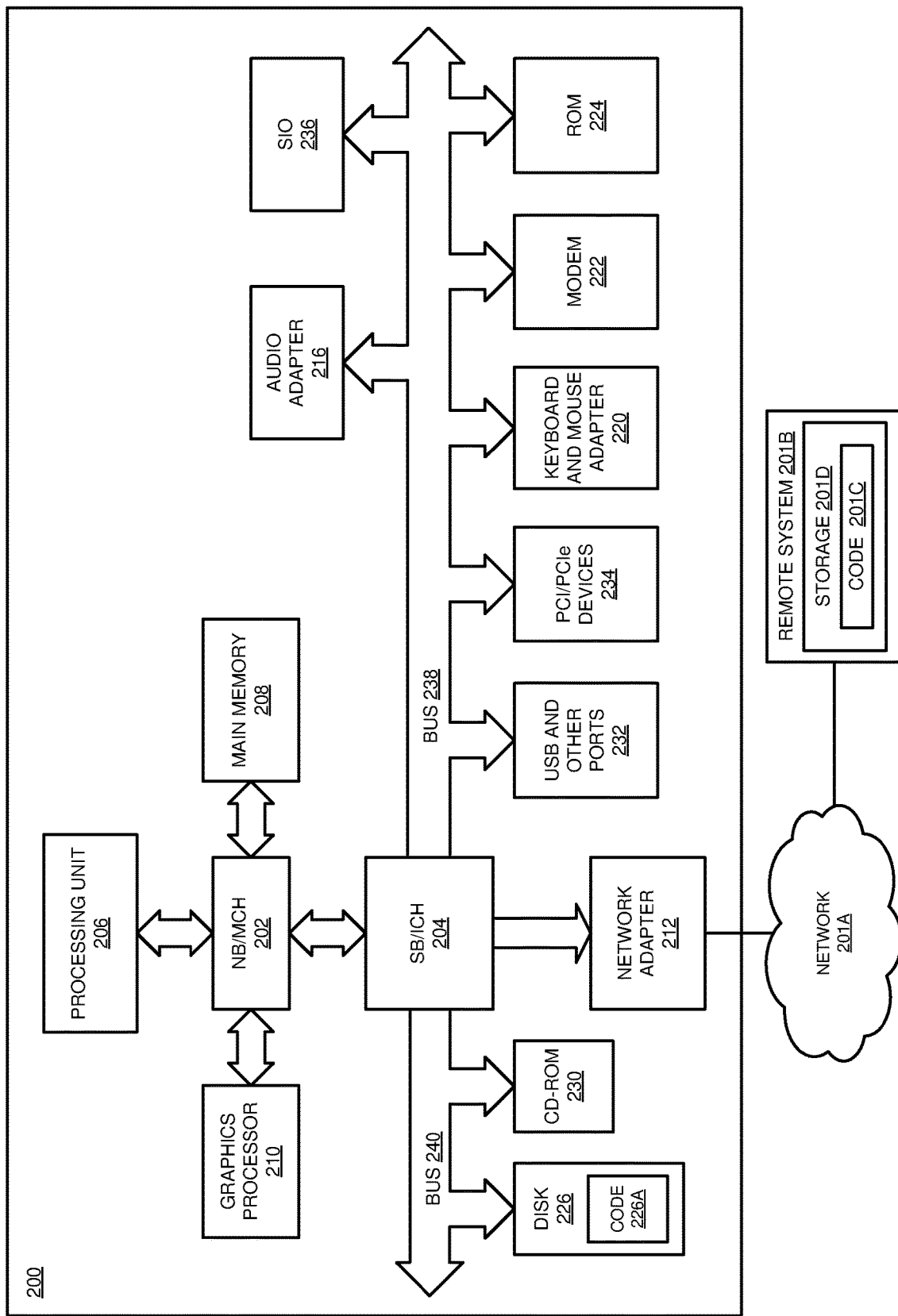
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 is a data processing system and couples to network 102 and storage unit 108A. Storage unit 108A includes a database 109A configured to store data as described herein with respect to various embodiments, for example image data and attribute data. Software applications may execute on any data processing system in data processing environment 100. Any software application described as executing in server 104 in FIG. 1 can be configured to execute in another data processing system in a similar manner. Any data or information stored or produced in server 104 in FIG. 1 can be configured to be stored or produced in another data processing system in a similar manner. A data processing system, such as server 104, may contain data and may have software applications or software tools executing computing processes thereon. In an embodiment, server 104 includes memory 124, which includes application 105A that may be configured to implement one or more of the data processor functions described herein in accordance with one or more embodiments.

Server 106 couples to network 102 along with storage unit 108B. Storage unit 108B includes a database 109B configured to store data as described herein with respect to various embodiments, for example image data and attribute data. Server 106 is a data processing system. In an embodiment, server 106 includes an application 105B that may be configured to implement one or more of the processor functions described herein in accordance with one or more embodiments.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. In an embodiment, device 132 sends requests to server 106 to perform one or more data processing tasks by application 105B such as initiating processes described herein. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Servers 104, 106, storage units 108A, 108B, and clients 110, 112, and 114, and device 132 may couple to network 102 using wired connections, wireless communication protocols, or other suitable data connectivity. Clients 110, 112, and 114 may be, for example, personal computers or network computers.

In the depicted example, servers 104, 106 may provide data, such as boot files, operating system images, and applications to clients 110, 112, and 114. Clients 110, 112, and 114 may be clients to servers 104, 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as server 104, 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer-implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200

Figure 3:
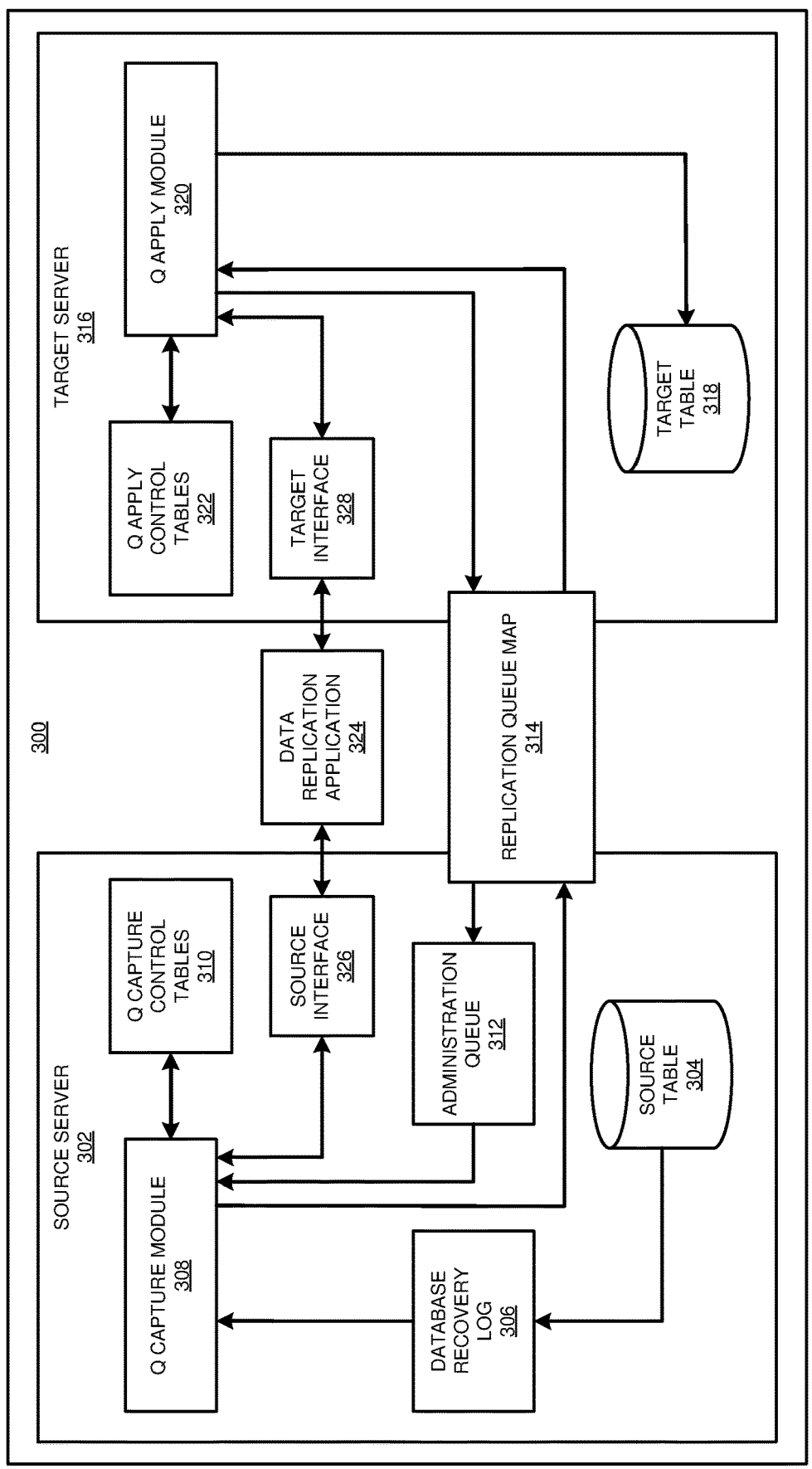
FIG. 3 depicts a block diagram of an example configuration of a data replication operation in accordance with an illustrative embodiment.

With reference to FIG. 3, this figure depicts a block diagram of an example configuration 300 in accordance with an illustrative embodiment. In a particular embodiment, the configuration 300 includes a source server 302 and a target server 316, which are examples of servers 104 and 106 of FIG. 1.

In the illustrated embodiment, the source server 302 includes a source table 304, a database recovery log 306, a Q capture module 308, one or more Q capture control tables 310, and an administration queue 312. The illustrated embodiment also includes a replication queue map 314 that maps the source server 302 to the target server 316. The target server 316 includes a target table 318, a Q apply module 320, and one or more Q apply control tables 322. The illustrated embodiment also includes a data replication application 324 that is in communication with the source server 302 via a source interface 326 and is in communication with the target server 316 via a target interface 328. In some embodiments, the functionality described herein is distributed among a plurality of systems, which can include combinations of software and/or hardware based systems, for example Application-Specific Integrated Circuits (ASICs), computer programs, or smart phone applications. In some embodiments, the servers 302, 316 operate in a cloud environment, where the source table 304 and the target table 318 are stored in respective clusters of a cloud storage system.

In some embodiments, a replication process is initiated and managed by the data replication application 324, which can operate as discussed in connection with FIG. 4. In some embodiments, the replication process captures changes to the source table 304 and converts committed transactional data to messages that are sent to the target server 316. In some embodiments, data is sent to the target server as soon as the replication process detects that the data has been committed at the source table 304 rather than being staged in tables.

More specifically, in some embodiments, the Q capture module 308 reads the database recovery log 306 for changed source data in the source table 304 and writes the changes to the replication queue map 314, which converts that data into messages and sends the messages to the target server 316. In some embodiments, the Q capture module 308 reads database recovery log 306 sequentially for committed changes to the source table 304. If the Q Capture program reads a committed change to the source table 304, it adds the change to the replication queue map 314. Transactions in the replication queue map 314 are therefore potentially subsets of the corresponding transactions in the database recovery log 306 because they contain only changes to the source table. As an example, when the Q capture module 308 reads a COMMIT statement for a transaction, it converts the transaction into a message and puts the message on a send queue in the replication queue map 314. The target server 316 then applies the transactions to the target table 318.

In some embodiments, the replication queue map 314 is a messaging middleware that uses messages and queues to support exchange of information between the source and target servers 302, 316. In some embodiments, the replication queue map 314 supports one or more communication protocols or APIs, for example Representational state transfer (REST), .NET, MQ Light, and MQTT.

In some embodiments, the Q capture module 308 uses a set of control tables 310, for example DB2® relational tables used as Q Capture control tables 310 (DB2 is a registered trademark of International Business Machines Corp.). In some embodiments, the Q Capture control tables 310 contain information about replication sources, the targets that correspond to them, and queues of the queue map 314 that are being used by the Q capture module 308. In some embodiments, the Q Capture control tables 310 also contain data that is used to check and monitor the performance of Q capture module 308, such as data about the current position of the Q capture module 308 in the recovery log 306.

In some embodiments, the Q apply module 320 uses a set of control tables 322, for example Q apply control tables 322. In some embodiments, the Q apply control tables 322 contain information about replication targets, the sources that correspond to them, and queues of the queue map 314 that are being used by the Q apply module 320. In some embodiments, the Q apply control tables 322 also contain data that is used to check and monitor the performance of Q apply module 320.

In some embodiments, the source and target tables 304, 318 include the same or different relational database management systems (RDBMSs). For example, in some embodiments, the source includes a "Brand A" database and the target includes a "Brand B" database, where both databases are offered by the same or different companies, and the two databases may support data types, structures, or commands that are not supported by the other database.

Figure 4:
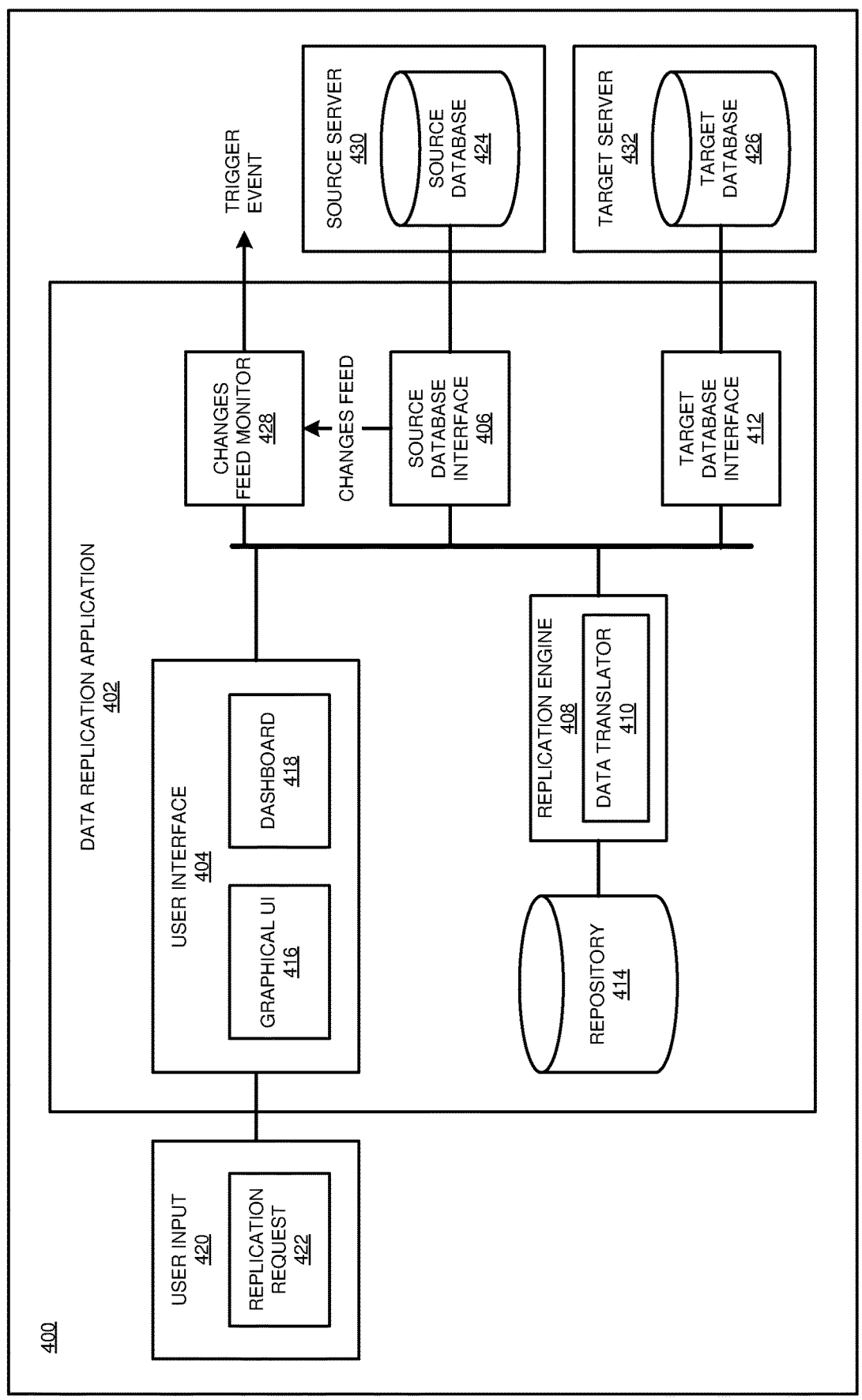
FIG. 4 depicts a block diagram of an example configuration for a data replication application in accordance with an illustrative embodiment.

With reference to FIG. 4, this figure depicts a block diagram of an example configuration 400 in accordance with an illustrative embodiment. The example embodiment includes a data replication application 402. In a particular embodiment, data replication application 402 is an example of application 105A/105B of FIG. 1.

In some embodiments, the data replication application 402 includes a user interface 404, a source database interface 406, a replication engine 408, a target database interface 412, a repository 414, and a changes feed monitor 428. In alternative embodiments, the data replication application 402 can be implemented as an automaton that includes some or all of the functionality described herein and grouped the same or grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications. In some embodiments, the data replication application 402 operates in a cloud environment, where the data of the source database 424 is stored in a single cluster of a cloud storage system and the target database 426 is stored in a different single cluster of the cloud storage system.

In some embodiments, the user interface 404 includes a graphical user interface (GUI) 416 and a replication dashboard 418. The GUI 416 allows a user to submit various user inputs 420 to the data replication application 402, including replication requests 422. In some embodiments, the GUI 416 includes form input elements that a user can populate with data that will be submitted as form data to submit replication requests 422. In some embodiments, the GUI 416 allows a user to set configuration parameters for configuration of a source database 424 and a target database 426 associated with the replication request 422. In some embodiments, the GUI 416 allows a user to create the target database 426. In alternative embodiments, the user interface 404 includes a command line interface in place of, or in addition to, the GUI 416.

The replication dashboard 418 allows a user to monitor the data replication process and receive various reports while the replication process is ongoing and/or upon completion of the replication process. In some embodiments, the replication dashboard 418 is a browser-based front end that displays status, alert, and performance information for the replication process. For example, in some embodiments, the replication dashboard 418 provides a graphical display of a summary overview that indicates all send and receive queues that are active. In some embodiments, the replication dashboard 418 monitors the progress of the replication process and updates the information shown on the graphical display in real time or near real time.

In some embodiments, the data replication application 402 generates one or more connections that are used to replicate data between the source database 424 and the target database 426. For example, in some embodiments, the data replication application 402 stores details of respective transactions (e.g., a set of tables and their columns along with other change data capture (CDC) properties such as filter/user exit, expressions, etc.) that are being replicated and details of how the source data is applied to the target database 426. In some such embodiments, the replication dashboard 418 provides a graphical display of information regarding status, alert situations, performance indicators for existing and/or active connections.

In some embodiments, the source database interface 406 communicates with source database 424 on source server 430. In some embodiments, the source database interface 406 locates source data in the source database 424 for replication according to the replication request 422. For example, in some embodiments, the replication request 422 designates some or all of the data of the source database as source data to be replicated. In some embodiments, the source database interface 406 is a DBMS or comprises a DBMS for managing the source data storage 424.

In some embodiments, the target database interface 412 communicates with target data storage 426. In some embodiments, the source database interface 412 writes the replicated source data as target data in the target database 426. In some embodiments, the target database interface 412 is a DBMS or comprises a DBMS for managing the target data storage 426.

In some embodiments, the source database interface 406 publishes a changes feed of messages related to actions associated with the source database 424. In some embodiments, the messages include a list of database commands occurring, for example the adds, edits, and deletes affecting the target data storage 424. For example, in some embodiments, the changes described by the changes feed include:
  Data indicative of a data value written to the target database
  Data indicative of source data corresponding to the data value written to the target database
  Data indicative of a unique value associated with the writing of the data value to the target database In some embodiments, a changes feed monitor 428 receives the feed and monitors the messages therein. In some embodiments, the changes feed monitor 428 is configurable by a user or by other elements of the data replication application 402. For example, a user or other element may configure the changes feed monitor 428 to monitor the changes feed for a specified condition specified by the changes feed or derived by the changes feed monitor 428 based at least in part on information provided by the changes feed. In some embodiments, the changes feed monitor 428 automatically triggers an event associated with the specified condition upon detecting that the specified condition has been satisfied. Non-limiting examples of events triggered by the changes feed monitor 428 include sending an email or other type of message that includes an alert or report related to the replication process, updating an in-memory database to record live counts of activity, writing data to a text file to push data into a database.

In some embodiments, the replication engine 408 includes a data translator 410. In some embodiments, the replication engine 408 receives data values of the source data and uses the data translator 410 to identify properties of the data values and return a full-fidelity representation of the property of the data value. The replication engine 408 then forwards the translated data to the target database interface 412 for writing as replicated data to the target database 426.

Figure 5:
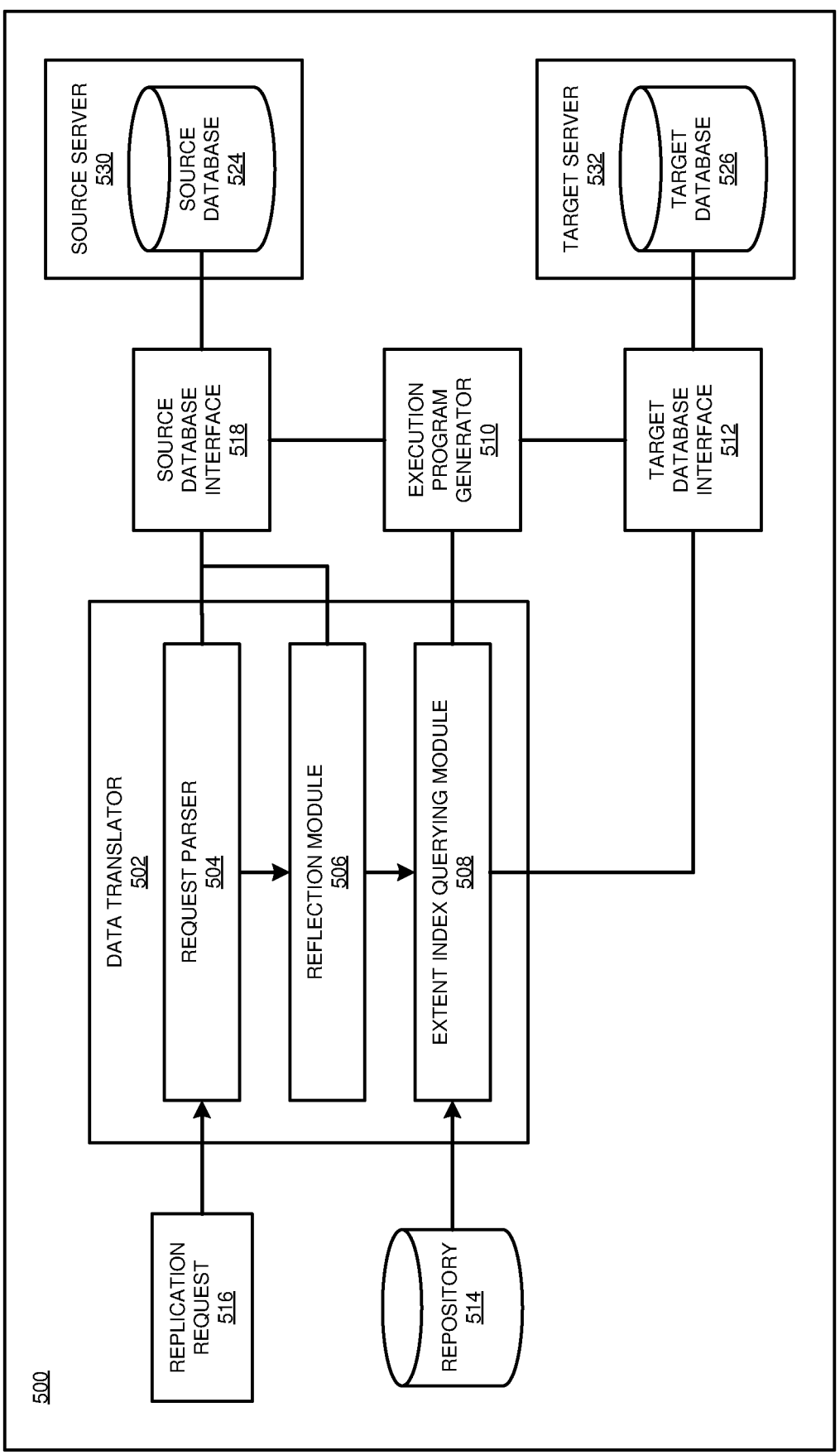
FIG. 5 depicts a block diagram of an example configuration for a data translator in accordance with an illustrative embodiment.

With reference to FIG. 5, this figure depicts a block diagram of an example configuration 500 for a data translator 502 in accordance with an illustrative embodiment. In the illustrated embodiment, the data translator 502 is an example of data translator 410 in FIG. 4.

In some embodiments, the data translator 502 includes a request parser 504, a reflection module 506, and an extent index querying module 508. In alternative embodiments, the data translator 502 is implemented as an automaton that includes some or all of the functionality described herein and grouped the same or grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In some embodiments, an execution program generator 510 generates a series of replication instructions for execution by the source and target databases 524, 526 to perform the replication according to the replication request 516. In some embodiments, the execution program generator 510 outputs the series of replication instructions to the source database interface 518 and the target database interface 512 according to which database the respective instruction applies.

In some embodiments, the replication involves disparate source and target systems. In such cases, the replication operation includes converting data types of data from the source database 524 to be compatible with the target database 526 in order to preserve the semantic meaning of the data. In some embodiments, the replication involves data tables that are structurally different from each other that require data transformations as part of the replication process. For example, in some embodiments, a target data table may have fields that are bigger or smaller than the corresponding source fields, columns that combine or split data from the source, fields that require formats that differ from the corresponding source fields (e.g., different date or time formats), or columns that are derived from one or more source columns. In some embodiments, the data translator 502 is used by a replication application to perform these data translations In some embodiments, the data translator 502 receives replication information from replication requests 516. In some embodiments, the data translator 502 receives a portion of the replication request 516 that has been filtered to include only replication information relating to data translations, such as object type conversions or transformations.

The request parser 504 receives and interprets the information and provides corresponding data and/or instructions to the reflection module 506. In some embodiments, the request parser 504 provides only instructions to the reflection module 506, and the reflection module 506 receives or fetches the data from the source database interface 518, which is in turn in communication with the source database 524 on a source server 530. In some embodiments, the execution program generator 510 instructs the source database interface 518 to fetch the data and provide it to the request parser 504.

In some such embodiments, each type of data is associated with a meta-structure referred to herein as an "Extent." Extents introduce a new declarative system based on common ur-types (things that repeat, things that contain things, things we can do arithmetic on, things we can read) that includes encoding for the structural information of the data and how to retrieve it. In some embodiments, each Extent is a meta-type system that lacks canonical structure, but has an Extent class that defines a single accessor that allows the automated process to discover the full fidelity of the data value. Thus, in some embodiments, an automated process uses Extents to work on common and unusual data in full fidelity. In some embodiments, the request parser 504 receives a replication request 516 associated with a desired data replication operation. In some embodiments, the replication request 516 includes an intention-based, declarative configuration description in which a user describes overall goals and objectives for the requested replication. In some embodiments, the replication request 516 includes one or more of a description of a customer environment, a desired end state of data at an origin, a desired structure and format of the data at a destination, existing data flows, environmental factors and data characteristics The request parser 504 parses the replication request 516 to collect parameters and goals input by a user for the replication operation. For example, in some embodiments, the request parser 504 includes an automated process or automaton that recognizes predefined functional descriptions available for use by users to explain how the users want to replicate their data. In some embodiments, the automated process will convert the user's data in accordance with the replication request 516 regarding the user's intent (e.g., "I want to concatenate this string and this number and store it in this location").

In some embodiments, the reflection module 506 receives data values of the source data from the source database 524 via source database interface 518 and uses a predetermined reflection process to identify properties of the data values. In some embodiments, the reflection module 506 includes a reflection API. In some embodiments, the reflection API allows an automated computerized process or automaton to inspect one or more data fields of the source data to identify properties of the data values. In some embodiments, the predetermined reflection process returns a full-fidelity representation of the property of the data value. In some embodiments, the reflection module 506 uses use a runtime type identification system, for example the Java® Reflection API, to discover the meta-type and encoding for each data value (Java is a registered trademark of Oracle America, Inc.). Java Reflection allows an executing Java program to examine or "introspect" upon itself, and manipulate internal properties of the program. In such embodiments, the source database 524 on source server 530 and the target database 526 on target server 532 use a Java Class based system for storing and accessing meta-type properties.

In some embodiments, the Extent index querying module 508 determines a meta-type for each data value using a data indexing system referred to herein as Extents stored in the repository 514. Extents are a top-down recursive descent recreation of the source data structures. Thus, Extents are a meta-type system and comprise the encoding for the structural information and how to retrieve it. Each Extent class defines a single accessor that enables an automated computerized process or automaton to match Extents to source data values by comparing accessor responses to properties of the source data types identified by the reflection module 506. Thus, each Extent class defines a single accessor that the Extent index querying module 508 can invoke to fetch information about the Extent class stored within the Extent class. The information about the Extent classes enables automation of a matching process that searches for an Extent class that can provide for a full fidelity representation of a data value by comparing the accessor responses to the information gleaned about the data values from the reflection processes.

In some embodiments, the output from the extent index querying module 508 is provided to the target database interface 512, which in turn transmits it to the target database 526 at the target server 532. In some such embodiments, the output from the extent index querying module 508 is transmitted under the control of the execution program generator 510.

Figure 6:
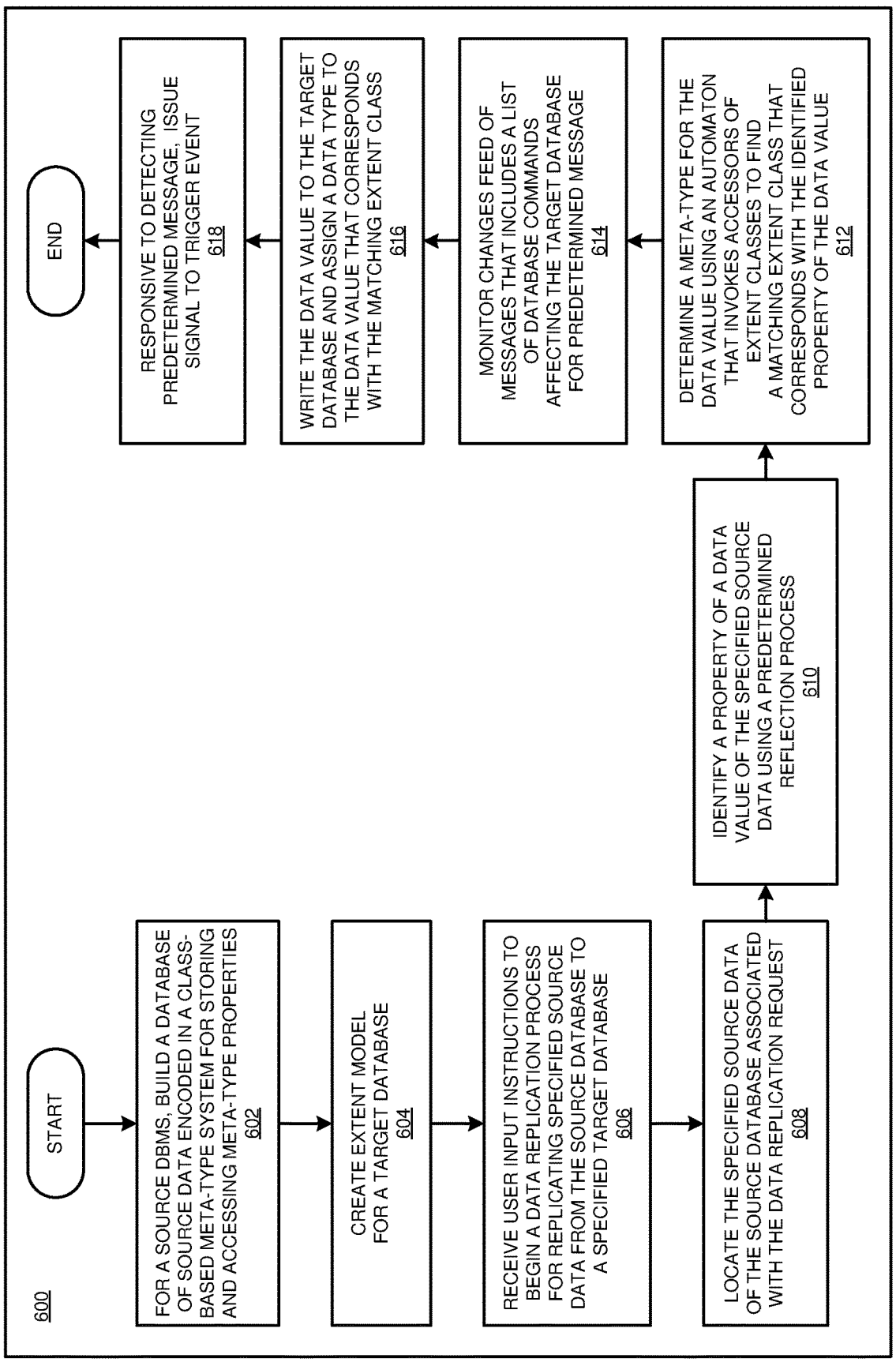
FIG. 6 depicts a flowchart of an example process for data-type conversion as part of a data replication process in accordance with an illustrative embodiment.

With reference to FIG. 6, this figure depicts a flowchart of an example data replication process 600. In a particular embodiment, the data replication application 324 carries out the process 600.

In an embodiment, at block 602, the data replication application 324 builds a source database of source data encoded in a class-based meta-type system for storing and accessing meta-type properties. In an embodiment, at block 604, the data replication application 324 receives user input instructions to begin a data replication process for replicating specified source data from the source database to a specified target database.

In an embodiment, at block 606, the data replication application 324 locates the specified source data of the source database associated with the data replication request. In an embodiment, at block 608, the data replication application 324 identifies a property of a data value of the specified source data using a predetermined reflection process. In an embodiment, at block 610, the data replication application 324 determines a meta-type for the data value using an automaton that invokes accessors of indexed extent classes to find a matching extent class that corresponds with the identified property of the data value. In an embodiment, at block 612, the data replication application 324 writes the data value to the target database and assign a data type to the data value that corresponds with the matching extent class.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer-implemented method, system or apparatus, and computer program product are provided in the illustrative embodiments for managing participation in online communities and other related features, functions, or operations. Where an embodiment or a portion thereof is described with respect to a type of device, the computer-implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
   locating, responsive to a data replication request, source data associated with the data replication request, the source data including a data value encoded in a class-based meta-type system for storing and accessing meta-type properties;
   identifying a property of the data value using a predetermined reflection process;
   determining a meta-type for the data value using an automaton that identifies a matching extent class from among an indexed set of extent classes that define respective accessors, the automaton invoking accessors of the extent classes to locate the matching extent class that corresponds with the property of the data value;
   generating target data having the data value and a data type that corresponds with the matching extent class;
   generating a changes feed that includes the data value and data type of the generated target data;
   continuously monitoring the changes feed during a plurality of additional iterations of the identifying of the property, the determining of the meta-type, the generating of the target data, and the generating of the changes feed,
   wherein the monitoring of the changes feed includes evaluating data received via the changes feed to determine whether a specified condition has been satisfied; and
   generating, responsive to determining that the specified condition has been satisfied, a trigger signal that initiates an event, the trigger signal comprising data indicative of information from the changes feed that satisfied the specified condition.

2. The computer-implemented method of claim 1, wherein the source data is encoded in the class-based meta-type system using a functional expression language.

3. The computer-implemented method of claim 1, wherein the indexed set of extent classes include an extent class associated with a semantic data type.

4. The computer-implemented method of claim 1, wherein the indexed set of extent classes include an extent class associated with a primitive data type.

5. The computer-implemented method of claim 1, wherein the predetermined reflection process includes a reflection application programming interface.

6. The computer-implemented method of claim 5, wherein the reflection application programming interface allows for inspection of a data field.

7. The computer-implemented method of claim 1, wherein the predetermined reflection process returns a full-fidelity representation of the property of the data value.

8. The computer-implemented method of claim 7, wherein the data replication request includes identification of a portion of a source database and a target database, and wherein the locating of the input data further comprises locating the input data in the identified portion of the source database.

9. The computer-implemented method of claim 8, further comprising writing the data value to the target database and assigning a data type to the data value that corresponds with the matching extent class.

10. A computer usable program product for ranking asset tags, the computer program product comprising one or more computer readable storage media, and program instructions collectively stored on the one or more computer readable storage media, the program instructions executable by a processor to cause the processor to perform operations comprising:
    locating, responsive to a data replication request, source data associated with the data replication request, the source data including a data value encoded in a class-based meta-type system for storing and accessing meta-type properties;
    identifying a property of the data value using a predetermined reflection process;
    determining a meta-type for the data value using an automaton that identifies a matching extent class from among an indexed set of extent classes that define respective accessors, the automaton invoking accessors of the extent classes to locate the matching extent class that corresponds with the property of the data value;
    generating target data having the data value and a data type that corresponds with the matching extent class;
    generating a changes feed that includes the data value and data type of the generated target data;
    continuously monitoring the changes feed during a plurality of additional iterations of the identifying of the property, the determining of the meta-type, the generating of the target data, and the generating of the changes feed,
    wherein the monitoring of the changes feed includes evaluating data received via the changes feed to determine whether a specified condition has been satisfied; and
    generating, responsive to determining that the specified condition has been satisfied, a trigger signal that initiates an event, the trigger signal comprising data indicative of information from the changes feed that satisfied the specified condition.

11. The computer usable program product of claim 10, wherein the stored program instructions are stored in a computer readable storage device in a data processing system, and wherein the stored program instructions are transferred over a network from a remote data processing system.

12. The computer usable program product of claim 10, wherein the stored program instructions are stored in a computer readable storage device in a server data processing system, and wherein the stored program instructions are downloaded over a network to a remote data processing system for use in a computer readable storage device associated with the remote data processing system, further comprising:

program instructions to meter use of the computer usable code associated with the request; and program instructions to generate an invoice based on the metered use.

13. The computer usable program product of claim 10, wherein the source data is encoded in the class-based meta-type system using a functional expression language.

14. The computer usable program product of claim 10, wherein the indexed set of extent classes include an extent class associated with a semantic data type.

15. The computer usable program product of claim 10, wherein the indexed set of extent classes include an extent class associated with a primitive data type.

16. The computer usable program product of claim 10, wherein the predetermined reflection process includes a reflection application programming interface.

17. A computer system comprising a processor and one or more computer readable storage media, and program instructions collectively stored on the one or more computer readable storage media, the program instructions executable by the processor to cause the processor to perform operations comprising:

locating, responsive to a data replication request, source data associated with the data replication request, the source data including a data value encoded in a class-based meta-type system for storing and accessing meta-type properties;

identifying a property of the data value using a predetermined reflection process;

determining a meta-type for the data value using an automaton that identifies a matching extent class from among an indexed set of extent classes that define respective accessors, the automaton invoking accessors of the extent classes to locate the matching extent class that corresponds with the property of the data value;

generating target data having the data value and a data type that corresponds with the matching extent class;

generating a changes feed that includes the data value and data type of the generated target data;

continuously monitoring the changes feed during a plurality of additional iterations of the identifying of the property, the determining of the meta-type, the generating of the target data, and the generating of the changes feed, wherein the monitoring of the changes feed includes evaluating data received via the changes feed to determine whether a specified condition has been satisfied; and generating, responsive to determining that the specified condition has been satisfied, a trigger signal that initiates an event, the trigger signal comprising data indicative of information from the changes feed that satisfied the specified condition.

18. The computer system of claim 17, wherein the source data is encoded in the class-based meta-type system using a functional expression language.

19. The computer system of claim 17, wherein the indexed set of extent classes include an extent class associated with a semantic data type.

20. The computer system of claim 17, wherein the indexed set of extent classes include an extent class associated with a primitive data type.

* * * * *